United States Patent
Li et al.

(10) Patent No.: US 9,321,899 B1
(45) Date of Patent: Apr. 26, 2016

(54) PREPARING LATEX USING A BIOSOLVENT

(71) Applicant: Xerox Corporation, Norwalk, CT (US)

(72) Inventors: Shigeng Li, Penfield, NY (US); Chieh-Min Cheng, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/527,750

(22) Filed: Oct. 29, 2014

(51) Int. Cl.
*C08J 3/09* (2006.01)
*C08J 3/12* (2006.01)
*C08K 5/101* (2006.01)
*C08K 5/42* (2006.01)
*C09D 5/02* (2006.01)

(52) U.S. Cl.
CPC ............. *C08K 5/101* (2013.01); *C08J 3/095* (2013.01); *C08K 5/42* (2013.01); *C09D 5/027* (2013.01)

(58) Field of Classification Search
USPC .................... 523/333, 342; 524/800
See application file for complete search history.

(56) References Cited

U.S. PATENT DOCUMENTS

| | | | |
|---|---|---|---|
| 2003/0181630 A1* | 9/2003 | Doi ............................ | C08J 3/03 528/272 |
| 2011/0204533 A1* | 8/2011 | Winchester .......... | A61K 9/5031 264/4.6 |
| 2013/0090442 A1* | 4/2013 | Pugh ....................... | C08F 26/06 526/263 |

* cited by examiner

*Primary Examiner* — Tae H Yoon

(57) ABSTRACT

A process for making a latex emulsion, where the process involves dissolving resin in a biosolvent that hydrolyzes on exposure to water.

19 Claims, No Drawings

PREPARING LATEX USING A BIOSOLVENT

FIELD

The present disclosure relates to producing resin emulsions useful for producing toner where the resin is dissolved in a biosolvent that hydrolyzes on exposure to water.

BACKGROUND

Resin emulsions can be produced using phase inversion emulsification (PIE). PIE typically includes use of organic solvents, such as, methyl ethyl ketone (MEK) and isopropyl alcohol (IPA), to dissolve the resin and then adding water to produce polyester latexes via phase change. Most organic solvents are hazardous and have to be removed from the latexes and then disposed of properly to meet environmental standards.

It would be advantageous to provide an improved process for preparing, "green," latex without using organic solvents.

SUMMARY

A process is disclosed for preparing latexes using a biosolvent which is 100% biodegradable and has 100% biobased content, including that there is no environmentally hazardous ingredient used during the process. The disclosed process is more simple than current PIE processes, leading to shorter cycle time and lower production costs. The latexes prepared by the method as disclosed are useful, for example, in making emulsion aggregation toner.

In embodiments, a method for preparing a latex emulsion from a resin is disclosed including combining a surfactant with a lactate ester, such as, ethyl lactate, to form a dispersion, wherein said lactate ester is biodegradable; mixing the dispersion with a resin until the resin dissolves to form a homogenous mixture; and combining the homogenous mixture with water to hydrolyze the lactate ester and to form a latex emulsion.

DETAILED DESCRIPTION

Latex emulsions of resins commonly are produced using PIE in which resins first are dissolved in an organic solvent, which may be a mixture of solvents, such as, methyl ethyl ketone (MEK) and isopropyl alcohol (IPA), then optionally neutralized with an appropriate base, and then some water (such as, deionized water (DIW) or (DI water)) may be introduced into the mixture to create a homogeneous water-in-oil (W/O) dispersion (water droplets dispersed in continuous oil). Subsequently, additional water is added to invert the phase of the dispersion into an oil-in-water (O/W) latex emulsion. Energy intensive processing of the latex, such as distillation, is used to remove organic solvents and finally, surfactant and other preservatives may be added to the latex. The latex can be used for a variety of purposes including in emulsion aggregation (EA) methods for the production of toner particles.

A solvent of interest is a biodegradable lactate ester which dissolves a resin. The lactate ester is an ester of lactic acid of the formula. $CH_3—CH(OH)—COOR$, where R can comprise a variety of hydrocarbon groups, including alkyl, either linear or branched, saturated or not, or cyclic, from $C_1$ to about $C_{10}$. Hence, examples include, methyl, ethyl, propyl, including n-propyl, isopropyl and cyclopropyl, butyl, including n-butyl, sec-butyl, isobutyl and tert-butyl, and so on. A cyclic compound may be substituted, may contain a heteroatom and may comprise more than one ring, which may be fused, and so on. Examples include aryl, phenyl, cycloalkyl and so on. On exposure of the lactate ester to water and acid or base, which $H^+$ ion can be contributed by the resin or by an acid or buffer, the biosolvent lactate ester hydrolyzes into one or more products. The resin is not soluble in the product(s) of the hydrolyzed biosolvent. Hence, as the effective concentration of biosolvent decreases with continuing hydrolysis, the once dissolved resin forms particles. Hydrolysis can continue until biosolvent is depleted, $H^+$ amounts are depleted, particle formation ceases or any other milestone as a design choice. Acid may be added to drive the hydrolysis to completion. The stage of the reaction can be assessed by monitoring the levels of the reagents or products using materials and methods known in the art, such as, a chromatography. The resin particles can be isolated or separated from the emulsion using methods known in the art. The biosolvent can be regenerated by combining the hydrolysis product(s) practicing, for example, an esterification reaction, using known materials and methods.

Ethyl lactate (EL), also known as lactic acid ethyl ester, is an example of a biosolvent of interest and is totally biodegradable. EL is found naturally in small quantities in a wide variety of foods including wine, chicken and various fruits. Due to low toxicity, EL is used in pharmaceutical preparations, food additives (approved by FDA) and fragrances. In addition, EL can be produced from biological and industrial sources. EL hydrolyzes in the presence of water and $H^+$ to form lactic acid and ethanol (EtOH). Lactic acid and EtOH each has use in the food, pharmaceutical and cosmetic industries.

Therefore, in the latex-forming process of interest, the biosolvent hydrolysis reaction is not reversible due to, for example, the waning concentration of $H^+$ from the limiting levels of dissolved resin, waning concentration of dissolved resin, waning concentration of biosolvent, excess levels of $H^+$ and so on to ensure maximal particle formation. The resulting resin particles are stable, which may benefit from presence of surfactant in and/or on the particle.

The level of biosolvent remaining or hydrolysis product(s) produced in the latex emulsion may be monitored during the reaction using materials and methods known in the art, such as, a chromatography, such as, gas or liquid chromatography for biosolvent level or hydrolysis product(s) level.

Because the resulting solution comprises the water soluble hydrolysis product(s), such as, ethanol (EtOH) and lactic acid when EL is used as the solvent, separation of the resin particles from the solvent can be as simple as any separation of an aqueous medium from a particulate, such as, filtration, centrifugation, decantation and so on, although other separation methods can be used including distillation, spray drying and so on. The particles can be washed any number of times with water to remove any EtOH and lactic acid, or other products when other lactate esters are used as biosolvent. The lactic acid and EtOH may be reused to produce EL where lactic acid and EtOH are reacted to form EL in an esterification reaction. EtOH may be used for other applications, including, but not limited to, inkjet priming, cosmetics, a solvent and the like, and lactic acid can be used in the food industry, as a chemical feed stock and so on.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

As used herein, "biobased," means a product (other than food or feed) that is composed, in whole or in substantial part (e.g., between about 55% to about 80% by weight of the compound or product, about 70% to about 80% by weight of the compound or product, of biological products or renewable materials (including plant, animal and microbial materials).

As used herein, the prefix, "bio," refers to a method that incorporates, or to a reagent or to a product that is composed, in whole or in part, of a biological product, including plant, animal and microbe materials, or derivatives thereof. Generally, a biomaterial or bio-based material is biodegradable, that is, substantially or completely biodegradable, by substantially is meant greater than 50%, greater than 60%, greater than 70% or more of the material is degraded from the original molecule or composition to another form by a biological or environmental mechanism, such as, action thereon by bacteria, animals, plants, light, temperature, oxygen and so on, in a matter of days, matter of weeks, a year or more, but generally no longer than two years. A, "biosolvent," is a liquid which dissolves a resin, such as, a polyester. The biosolvent is composed of a bio-based material in whole or in part and is biodegradable.

Resins

Any resin soluble in biosolvent may be utilized in forming a latex emulsion of the present disclosure. The resins may be an amorphous resin, a crystalline resin and/or a combination thereof. The resin may be a polyester resin, including the resins described, for example, in U.S. Pat. Nos. 6,593,049 and 6,756,176, the entire disclosure of each of which hereby is incorporated by reference in entirety. Suitable resins also may include a mixture of an amorphous polyester resin and a crystalline polyester resin as described in U.S. Pat. No. 6,830,860, the entire disclosure of which hereby is incorporated by reference in entirety. Suitable resins may include a mixture of high molecular and low molecular weight amorphous polyester resins.

In embodiments, the resin may be a polyester resin formed by reacting a polyol with a polyacid in the presence of an optional catalyst.

For forming a crystalline or amorphous polyester, suitable polyols include aliphatic polyols with from about 2 to about 36 carbon atoms selected in an amount of from about 40 to about 60 mole %.

Examples of polyacids or polyesters include vinyl diacids or vinyl diesters selected in an amount of, for example, from about 40 to about 60 mole %.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present in an amount of from about 1 to about 50% by weight of the toner components. The crystalline resin may possess various melting points of, for example, from about 30° C. to about 120° C. The crystalline resin may have a number average molecular weight (Mn), as measured by gel permeation chromatography (GPC) of, for example, from about 1,000 to about 50,000 and a weight average molecular weight (Mw) of, for example, from about 2,000 to about 100,000, as determined by GPC. The molecular weight distribution (Mw/Mn) of the crystalline resin may be, for example, from about 2 to about 6.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole % to about 5 mole % based on the starting polyacid or polyester used to generate the polyester resin.

Examples of unsaturated amorphous resins that can be used include those disclosed in U.S. Pat. No. 6,063,827, the entire disclosure of which is hereby incorporated by reference in entirety.

The amorphous resin may be present, for example, in an amount of from about 30 to about 100% by weight of the toner components. In embodiments, the amorphous resin or combination of amorphous resins utilized in the latex may have a glass transition temperature (Tg) of from about 30° C. to about 80° C. In embodiments, the combined resins utilized in the latex may have a melt viscosity of from about 10 to about 1,000,000 Pa*S at about 130° C.

Other suitable resins that can be used to make toner comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof.

One, two or more resins may be used. Where two or more resins are used, the resins may be in any suitable ratio (e.g., weight ratio), such as, of from about 1% (first resin)/99% (second resin) to about 99% (first resin)/1% (second resin).

A toner may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20%/o crystalline resin.

A toner may include at least two amorphous polyester resins, a high molecular weight resin and a low molecular weight resin. As used herein, a high molecular weight (HMW) amorphous resin may have an Mw of from about 35,000 to about 150.000 and a low molecular weight (LMW) amorphous resin may have an Mw of from about 10,000 to about 30,000.

The weight ratio of the two resins may be from about 10% first amorphous resin/90% second amorphous resin to about 90% first amorphous resin/10% second amorphous resin.

The resin may possess acid groups which, in embodiments, may be present at the terminus of a resin molecule. Acid groups, which may be present, include carboxylic acid groups. The number of acid groups may be controlled by adjusting the materials utilized to form the resin and reaction conditions. The resin may have an acid number from about 2 mg KOH/g of resin to about 200 mg KOH/g of resin.

Biosolvent

Any suitable lactate ester may be used to dissolve a resin, for example, lactic acid ethyl ester (i.e., ethyl lactate). The amount of resin that is combined with the biosolvent, on a weight basis, can be from about 3 wt % to about 4.5 wt %, from about 3.25 wt % f to about 4.25 wt %, from about 3.5 wt % to about 4 wt %, although amounts outside of those ranges can be used, so long as the resin dissolves completely in the biosolvent.

The biosolvent may or may not be miscible with water and may have a boiling point of from about 30° C. to about 200° C.

Surfactant

The process of the present disclosure includes adding a surfactant to the biosolvent before or after adding resin to the biosolvent. In embodiments, surfactant can be mixed with a resin before adding to the biosolvent.

One, two or more surfactants can be used in the process of interest or in other emulsions or mixtures. The surfactants may be selected from ionic surfactants and nonionic surfactants. Anionic surfactants and cationic surfactants are encompassed by the term, "ionic surfactants." The surfactant may be added as a solid or as a solution with a concentration of from about 5% to about 100% (pure surfactant) by weight, from about 10% to about 95% by weight. The surfactant is present in an amount of from about 100%/to about 250% relative to the weight of the resin, from about 130% to about 210% by weight, from about 150% to about 190% by weight of the resin.

Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, alkyldiphenyloxide disulfonic acids and salts thereof, abitic acid, NEOGEN R® and NEOGEN SC® available from Kao, Tayca Power®, available from Tayca Corp., DOWFAX®, available from Dow Chemical Co., such as, 2A1, which is alkyldiphyenyloxide disulfonate; sodium dodecyl diphenyl oxide disulfonate (i.e., CALFAX®, available from Pilot Chemical Co, Cincinnati, Ohio) and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$,$C_{17}$-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether dialkylphenoxypoly(ethyleneoxy)ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

Processing

The present process may include forming a mixture, optionally at an elevated temperature, containing a resin, a biosolvent, which can be a mixture or two or more biosolvents and a surfactant to form a resin mixture. Resins may be preblended prior to forming the mixture. The elevated temperature may be near to or above the Tg or melting point of the resin(s).

Thus, in embodiments, a process of the present disclosure may include contacting at least one resin and a surfactant with a biosolvent to form a resin mixture, optionally heating the resin mixture to an elevated temperature, optionally adding an acid forming $H^+$ to said mixture, optionally stirring or shaking the mixture, adding water to the mixture to hydrolyze the biosolvent to induce resin particle formation and collecting the resin particles.

Surfactant can be mixed or dissolved in the biosolvent, optionally at an elevated temperature. Surfactant is mixed with biosolvent, on a weight basis, in an amount from about 5 wt % to about 7.5 wt %, from about 5.5 wt % to about 7 wt %, from about 6 wt % to about 6.5 wt %. When fully dissolved, resin then is added to the solution.

Mixing may be conducted utilizing any means within the purview of those skilled in the art. For example, mixing may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures.

Stirring, although not necessary, can be conducted at a stirring speed sufficient to ensure resin dissolution in the biosolvent and/or a homogeneous preparation is obtained. Lower speeds can be used. Any stirring can be continued until dissolution occurs or a homogeneous preparation is obtained.

Water is added to the mixture to induce biosolvent hydrolysis and resin emulsion formation in a ratio of biosolvent to water, either on a weight or volume basis, of from about 1:6 to about 1:2, from about 1:5.5 to about 1:2.5, from about 1:5 to about 1:3. However, water amounts outside of those ratios can be used as a design choice, an artisan can monitor progress of biosolvent hydrolysis and/or particle formation.

Following formation of the emulsion, additional surfactant or water, or optional neutralizing agent can be added to the emulsion, although not required.

When particle formation is completed, for example, no further change in reactant concentration, hydrolysis product concentration or solids content is observed, or at any milestone as a design choice, the resin particles are removed from the suspension by known methods, such as, filtration, decantation, centrifugation and so on. The liquids can be separated, for example, by distillation, and recycled as taught herein, for example, either to regenerate biosolvent, or the resulting product(s) of the degradation of the biosolvent can be used for known purposes.

The desired properties of the resin (i.e., particle size, such as, about 200 nm, and low residual biosolvent level) may be achieved by adjusting the resin, biosolvent, surfactant, process parameters (i.e., reactor temperature, vacuum and process time) and so on.

Toner

The resulting latex then may be utilized to form a toner by any method within the purview of those skilled in the art. The latex emulsion may be contacted with an optional colorant, optionally in a dispersion, an optional wax and so on as known in the art to form toner by a suitable process, such as, an emulsion/aggregation (EA) and coalescence process.

Colorants

Various known suitable colorants, such as dyes, pigments, mixtures of dyes, mixtures of pigments, mixtures of dyes and pigments, and the like, may be included in the toner. In embodiments, the colorant may be included in the toner in an amount of, for example, 0 to about 35% by weight of the toner, although the amount of colorant can be outside of that range.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060®; Columbian magnetites, MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites. NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment generally is used as a water-based dispersion.

Wax

Optionally, a wax may also be combined with the resin and a colorant in forming toner particles. The wax may be provided in a wax dispersion, which may include a single type of wax or a mixture of two or more different waxes.

When included, the wax may be present in an amount of, for example, from about 1% by weight to about 25% by weight of the toner particles, although the amount of wax can be outside of that range. When a wax dispersion is used, the wax dispersion may include any of the various waxes conventionally used in emulsion aggregation toner compositions. Waxes that may be selected include those having, for example, an average molecular weight of from about 500 to about 20,000.

Neutralizing Agent

The resin may be mixed with a weak base or buffer to enhance dissolution in the pre-aggregation mixture. The neutralizing agent may be used to neutralize acid groups in the resin, so a neutralizing agent herein may also be referred to as a, "basic neutralization agent." Any suitable basic neutralization reagent may be used and may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, which compounds may be substituted at any carbon position on the ring.

Utilizing the above basic neutralization agent in combination with a resin possessing acid groups, a neutralization ratio of from about 25% to about 300% may be achieved. The neutralization ratio may be calculated as the molar ratio of basic groups provided with the basic neutralizing agent to the acid groups present in the resin multiplied by 100%.

Toner Preparation

The toner particles may be prepared by any method within the purview of one skilled in the art. Although embodiments relating to toner particle production are described below with respect to EA processes, any suitable method of preparing toner particles may be used, including, chemical processes, such as, suspension and encapsulation processes disclosed in U.S. Pat. Nos. 5,290,654 and 5,302,486, the entire disclosure of each of which hereby is incorporated by reference in entirety. Toner may be made in a batch reactor, a microreactor, a continuous reactor, any other method using any other apparatus, or combination thereof.

In embodiments, toner compositions may be prepared by EA processes, such as, a process that includes aggregating a mixture of an optional colorant, an optional wax and any other desired or required reagents, and emulsions including a resin made as described above, optionally with surfactants as described above, and then coalescing the aggregated particle mixture. The pH of the resulting mixture may be adjusted by an acid such as, for example, acetic acid, nitric acid etc., to a pH of from about 2 to about 5.

Following preparation of a mixture for forming toner including a resin, optional colorant, optional wax, optional neutralizing agent and so on, an aggregating agent may be added to the mixture to enhance particle formation. Any suitable aggregating agent may be utilized to form a toner particle. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicates (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

The aggregating agent may be added to the mixture utilized to form a toner in an amount of, for example, from about 0.1% to about 10% by weight of the resin in the mixture.

The particles aggregate until a desired particle size is obtained. Particle size can be monitored during the growth process, for example, with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hr to about 6 hr while maintaining stirring, to provide the aggregated particles.

Once the desired size of the toner particles is achieved, the pH of the mixture may be adjusted with base or a buffer to a pH of from about 3 to about 10 to freeze, that is, to stop, toner growth. The base utilized may be any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired value noted above.

Shell Resin

In embodiments, after aggregation, but prior to coalescence, a resin coating may be applied to the aggregated particles to form a shell thereover. Any resin described above or as known in the art may be utilized as the shell. A polyester amorphous resin latex as described above may be included in the shell, which may be combined with a different resin, and then added to the particles as a resin coating to form a shell.

The shell resin may be applied to the aggregated particles by any method within the purview of those skilled in the art. The resins utilized to form the shell may be in an emulsion, including any surfactant described above, an initiator, a branching agent, a conductive compound and so on, as known in the art. The emulsion possessing the resins may be combined with the aggregated particles described above so that the shell forms over the aggregated particles.

The shell may be present in an amount of from about 10% by weight to about 40% by weight of the latex particles.

Coalescence

Following aggregation to the desired particle size and application of any optional shell, the particles then may be coalesced to the desired final shape, the coalescence being achieved by, for example, heating the mixture to a temperature of from about 45° C. to about 100° C., which may be at or above the Tg and/or melting point of the resins utilized to form the toner particles. Coalescence may be accomplished over a period of from about 0.01 to about 9 hours.

After aggregation and/or coalescence, the mixture may be cooled to room temperature (RT), such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method for drying, including, for example, freeze-drying.

Additive

The toner particles may contain positive or negative charge control agents, for example, in an amount of from about 0.1 to about 10% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the entire disclosure of which is hereby incorporated by reference in entirety; organic sulfate and sulfonate compositions, including those disclosed in U.S. Pat. No. 4,338,390, the entire disclosure of which is hereby incorporated by reference in entirety; cetyl pyridinium tetrafluoroborates; distearyl dimethyl ammonium methyl sulfate, aluminum salts, such as, BONTRON E84™ or E88™ (Orient Chemical Industries, Ltd.); combinations thereof and the like.

Flow additives also can be blended with the toner particles. Examples include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN 700, and mixtures thereof.

Each of the external additives may be present in an amount of from about 0.1% by weight to about 5% by weight of the toner, although the amount of additives can be outside of those ranges.

In embodiments, the dry toner particles having a shell of the present disclosure may, exclusive of external surface additives, have the following characteristics:

(1) volume average diameter (also referred to as "volume average particle diameter") of from about 3 to about 25 µm;

(2) number average geometric size distribution (GSDn) and/or volume average geometric size distribution (GSDv) of from about 1.05 to about 1.55; and (3) circularity of from about 0.93 to about 1, in embodiments, from about 0.95 to about 0.99 (as measured with, for example, a Sysmex FPIA 2100 analyzer).

In embodiments, the final size of the toner particles may be less than about 8 µm, less than about 7 µm, less than about 6 µm in size.

The characteristics of toner particles may be determined by any suitable technique and apparatus, such as, a Beckman Coulter MULTISIZER 3.

The toner can be used in an electrophotographic, xerographic or other imaging device as known in the art.

The subject matter now will be exemplified in the following non-limiting examples. Parts and percentages are by weight unless otherwise indicated.

EXAMPLE

Ten grams of DOWFAX® 2A1 surfactant were dispersed in 160 g ethyl lactate under mechanical mixing for 10 min. Then, 6 g of an amorphous resin were added to the solution and the mixing was continued for another 30 min until the resin dissolution became homogenous. Subsequently, the resin dissolution was mixed with water at a weight ratio of 1:4 to prepare the latex. The particles were measured by Nanotrac for size and the D50 was 234 nm with a monomodal peak.

A control sample was prepared using MEK as the solvent with the identical procedure. A latex was not produced, the resin coagulated as a singular yellow mass.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are incorporated herein by reference in entirety.

We claim:

1. A method for preparing a latex emulsion from a resin comprising:
  a) combining a surfactant with a lactate ester to form a dispersion, wherein said lactate ester is biodegradable;
  b) mixing the dispersion with a resin until a homogenous mixture forms; and c) combining the homogenous mixture with water to hydrolyze said lactate ester and to form a latex emulsion.

2. The method of claim 1, wherein said resin comprises a polyester polymer.

3. The method of claim 1, wherein said ester is lactic acid ethyl ester.

4. The method of claim 1, wherein said resin comprises an amorphous resin or a crystalline resin.

5. The method of claim 1, wherein following (c), said resin of said latex emulsion is isolated by centrifugation, filtration, distillation or spray drying.

6. The method of claim 1, wherein said surfactant is selected from the group consisting of an anionic surfactant, a cationic surfactant, a non-ionic surfactant and combinations thereof.

7. The method of claim 1, wherein said surfactant comprises an alkyldiphenyloxide disulfonic acid or salt thereof.

8. The method of claim 1, wherein said surfactant comprises alkyldiphenyloxide disulfonate.

9. The method of claim 1, wherein water is added at a ratio of from about 1:6 to about 1:2 relative to said ester.

10. The method of claim 1, wherein said lactate ester hydrolyzes to an organic acid and an alcohol after mixing with water.

11. The method of claim 1, wherein surfactant is added in an amount from about 5 wt % to about 7.5 wt % relative to said ester.

12. The method of claim 1, wherein resin is added in an amount from about 3 wt % to about 4.5 wt % relative to said ester.

13. A method for preparing resin particles comprising:
a) combining an alkyldiphenyloxide disulfonate with lactic acid ethyl ester to form a solution;
b) mixing the solution with a resin until a homogenous mixture forms;
c) combining the homogenous mixture with water to hydrolyze said lactic acid ethyl ester and to form resin particles in an emulsion; and
d) separating the resin particles from said emulsion.

14. The method of claim 13, wherein said resin comprises a polyester polymer.

15. The method of claim 13, wherein said resin comprises an amorphous resin or a crystalline resin.

16. The method of claim 13, wherein said resin particles are isolated by centrifugation, filtration, distillation or spray drying.

17. The method of claim 13, wherein water is added at a ratio of from about 1:6 to about 1:2 relative to said ester.

18. The method of claim 13, wherein surfactant is added in an amount from about 5 wt % to about 7.5 wt % relative to said ester.

19. The method of claim 13, wherein resin is added in an amount from about 3 wt % to about 4.5 wt % relative to said ester.

* * * * *